United States Patent [19]

Yamaguchi

[11] Patent Number: 5,764,292

[45] Date of Patent: Jun. 9, 1998

[54] IMAGE PICKUP APPARATUS HAVING A DIAPHRAGM AND A HIGH-RESOLUTION DIAPHRAGM

[75] Inventor: Toshinobu Yamaguchi, Machida, Japan

[73] Assignee: Canon Kabushiki Kaisha, Tokyo, Japan

[21] Appl. No.: 573,285

[22] Filed: Dec. 15, 1995

[30] Foreign Application Priority Data

Dec. 29, 1994 [JP] Japan .................... 6-339798

[51] Int. Cl.$^6$ .................................... H04N 5/238
[52] U.S. Cl. ................................ 348/363; 348/484
[58] Field of Search .......................... 348/207, 335, 348/342, 344, 362, 363, 375; 396/101, 276, 505, 506, 507, 484, 494, 355; H04N 5/225

[56] References Cited

U.S. PATENT DOCUMENTS

| | | | |
|---|---|---|---|
| 4,047,212 | 9/1977 | Yamada | 396/505 |
| 5,293,542 | 3/1994 | Ise et al. | 348/363 |
| 5,327,193 | 7/1994 | Date et al. | 348/363 |

*Primary Examiner*—Andrew I. Faile
*Assistant Examiner*—Tuan V. Ho
*Attorney, Agent, or Firm*—Fitzpatrick, Cella, Harper & Scinto

[57] ABSTRACT

An image pickup apparatus includes a first diaphragm having a variable numerical aperture, and a second diaphragm having a fixed numerical aperture. A light-reducing member is disposed on a moving portion of the first diaphragm. The light-reducing member can be inserted in or retracted from the optical path of the second disphragm by operating the first diaphragm when the second diaphragm is being used.

17 Claims, 6 Drawing Sheets

FIG.6(a)
ORDINARY PHOTOGRAPHING MODE

FIG.6(b)
HIGH-PICTURE-QUALITY PHOTOGRAPHING MODE

IMAGE PICKUP APPARATUS HAVING A DIAPHRAGM AND A HIGH-RESOLUTION DIAPHRAGM

BACKGROUND OF THE INVENTION

1. Field of the Invention

This invention relates to a diaphragm device or an image pickup apparatus which may include a first diaphragm having a variable numerical aperture and a second diaphragm having a fixed numerical aperture, wherein the diaphragms can be appropriately selected in accordance with a photographing mode.

2. Description of the Related Art

A diaphragm unit (see FIG. 1) used in a conventional video camera or small still-picture camera forms a diaphragm with a plurality of diaphragm blades, two or three in most cases. Hence, the aperture of the diaphragm which is stopped down has a polygonal or distorted shape, and is therefore considerably influenced by diffraction of light or the like. Such non-circular diaphragm aperture shape which is one of the causes of degraded picture quality.

An ND (neutral-density) filter for reducing the influence of light diffraction at small stop values and thus achieving a high-resolution photographing operation may be bonded to a diaphragm blade in some cameras. However, since a part of the ND filter enters the optical path when the stop value is not so small, the ND filter itself becomes one of factors for degrading the picture quality.

The configuration of such a diaphragm unit will be described in detail with reference to FIG. 1.

Figure 1:
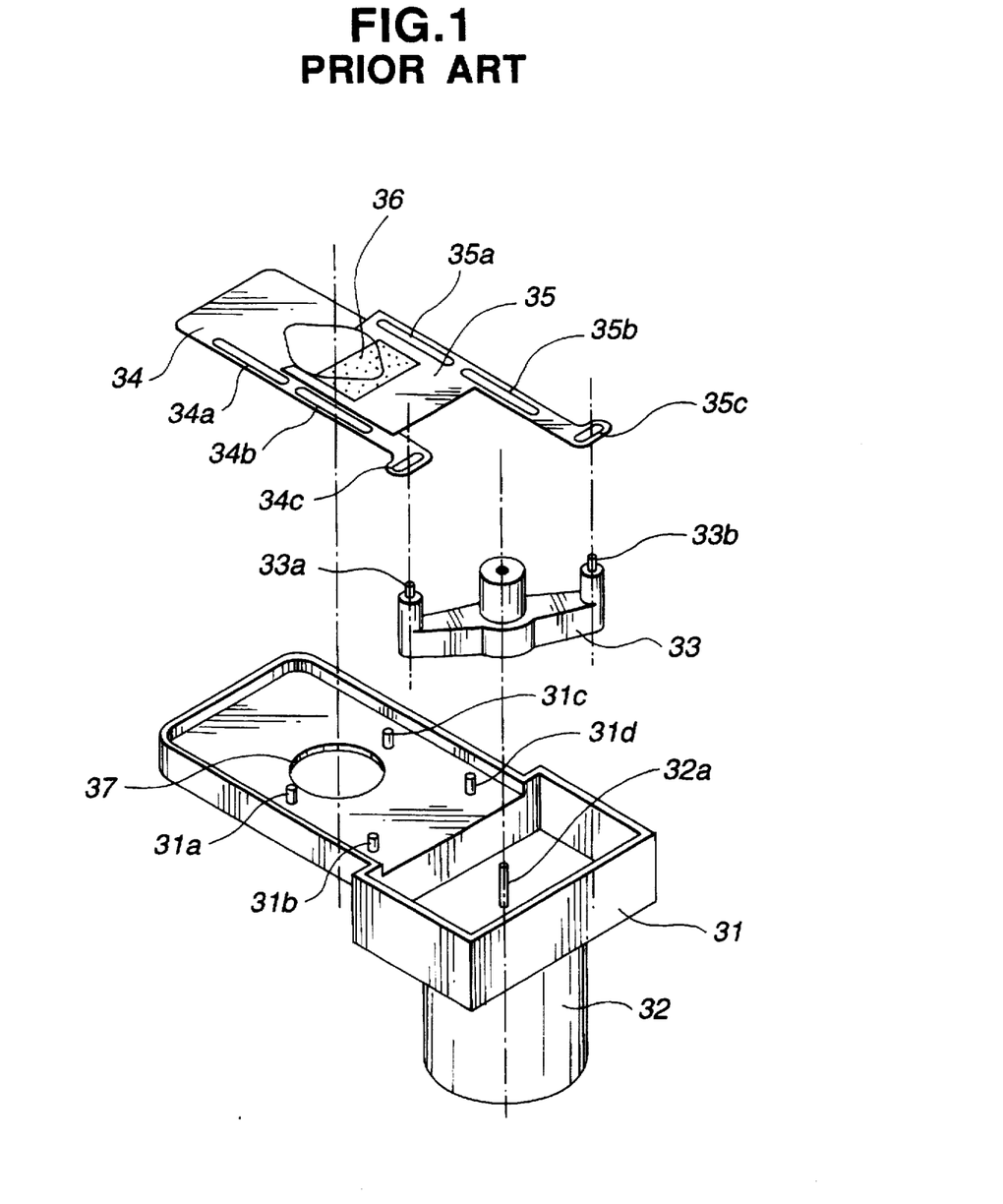
FIG. 1 is a diagram illustrating the structure of a conventional diaphragm unit.

In FIG. 1, reference numeral 31 represents a base. An actuator 32 comprises a stepping motor or the like. The center of a driving lever 33 is subjected to press fitting relative to the rotation shaft 32a of the actuator 32. There are also shown overlapping diaphragm blades 34 and 35. Slits 34a and 34b, and 35a and 35b provided in the diaphragm blades 34 and 35 are engaged with shafts 31a and 31b, and 31c and 31d on the base 31 so as to guide the diaphragm blades 34 and 35 to move in parallel, respectively. Slits 34c and 35c provided in the diaphragm blades 34 and 35 are engaged with shafts 33a and 33b provided on the driving lever 33 so as to slide the diaphragm blades 34 and 35 in opposite directions, respectively, by the rotation of the driving lever 33. An ND filter 36 is bonded to the diaphragm blade 35.

Figure 2:
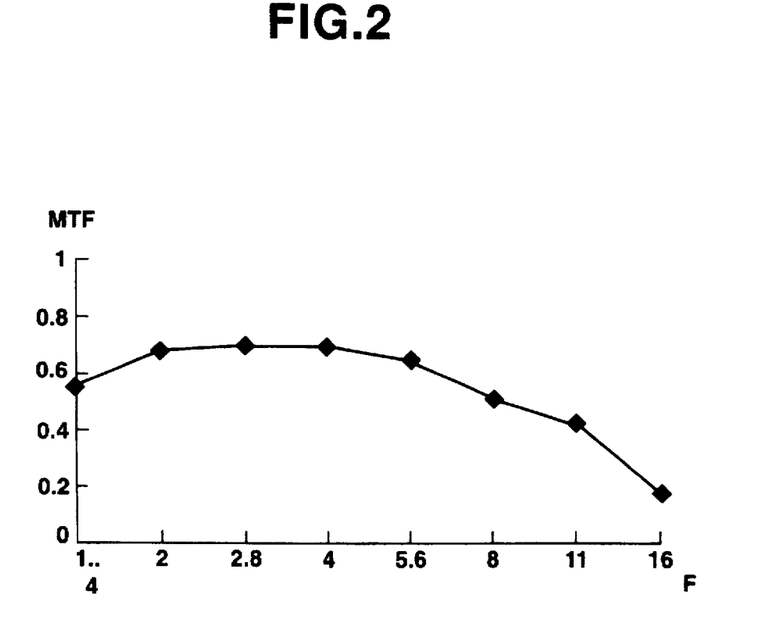
FIG. 2 is a graph illustrating the MTF versus stop value relationship for a lens whose aberrations are favorably corrected.

In general, the resolution (MTF (mutual transfer function)) for the stop value (F) of a lens whose abberations are favorably corrected has a characteristic as shown in FIG. 2. That is, in an actual lens, the resolution (MTF) represented on the ordinate has a convex shape with respect to the stop value (F) represented on the abscissa due to remaining aberrations, so that a stop value having the highest resolution is present in the middle of the abscissa.

In consideration of such a fact, an image pickup apparatus has been proposed in which, in order to perform a high-resolution photographing operation, a diaphragm device is configured by combining a diaphragm unit comprising a plurality of diaphragm blades with a stop plate having a circular stop insertable/retractable relative to the optical path of the photographing lens. In such an apparatus, a photographing operation is performed by switching between (i) a standard photographing mode of utilizing the function of controlling the stop diameter and the shutter function of the diaphragm unit, and (ii) a high-resolution photographing mode of using the circular stop of the fixed stop plate as the stop diameter at the highest resolution with the circular stop of the fixed stop plate and utilizing only the shutter function of the diaphragm unit while opening the diaphragm.

Figure 3:
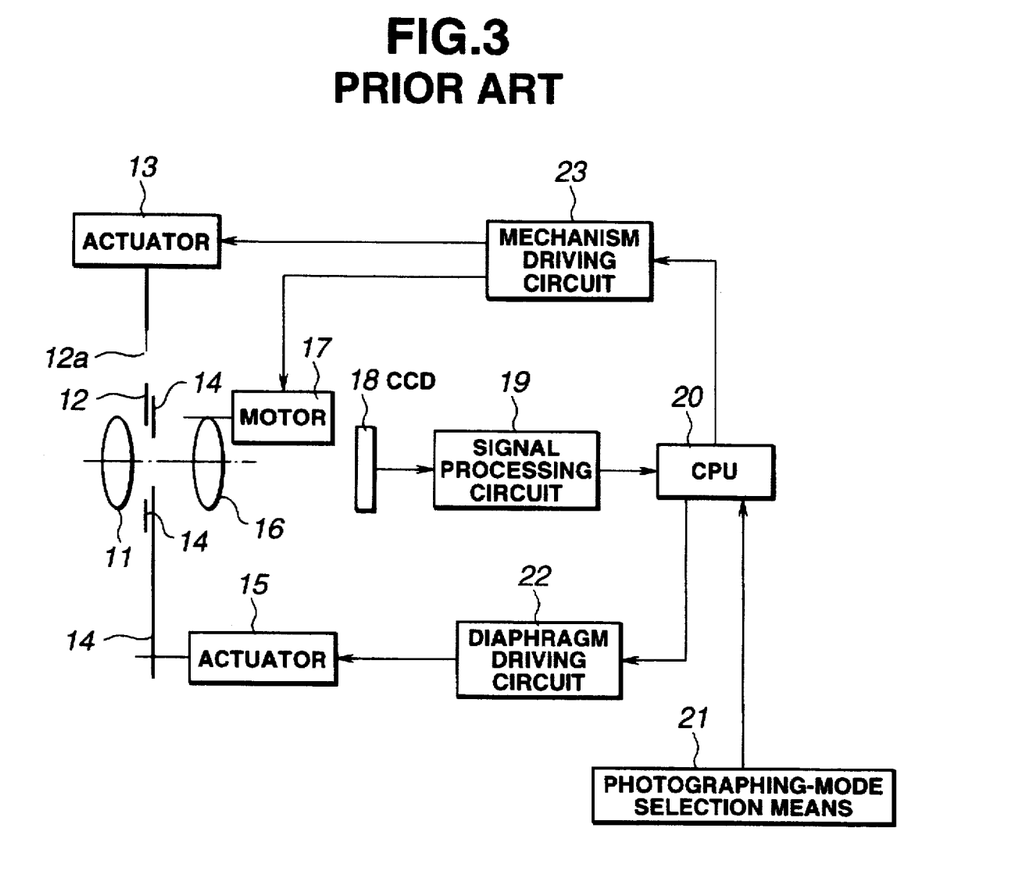
FIG. 3 is a block diagram illustrating a conventional image pickup apparatus.

FIG. 3 illustrates the configuration of an image pickup apparatus including such a diaphragm device configured by a combination of a diaphragm unit, comprising a plurality of diaphragm blades, and a stop plate having a circular stop insertable/retractable relative to the optical path of the photographing lens. In FIG. 3, reference numeral 11 represents a photographing lens, and reference numeral 12 represents a stop plate which is inserted in the optical path in accordance with a photographing mode. The stop plate 12 is configured such that a circular stop 12a is inserted in and retracted from the optical path by means of an actuator 13, such as a solenoid or the like.

Diaphragm blades 14 of the diaphragm unit are configured such that two blades open and close the diaphragm by sliding with each other by the rotation of an actuator 15, such as a stepping motor or the like.

A focusing lens 16 is driven in the direction of the optical axis by a stepping motor 17. Reference numeral 18 represents an image pickup device, such as a CCD (charge-coupled device) or the like. Light from an object passing through the photographing lens 11 is focused onto the image pickup device 18 while the focus position is adjusted by the focusing lens 16, and is input to a signal processing circuit 19 after being subjected to photoelectric conversion. The signal processing circuit 19 processes the input signal and outputs the resultant signal to recording means (not shown) or the like as an image signal, and also outputs brightness information and focus information of the object to a CPU (central processing unit) 20.

The CPU 20 controls the actuators 13, 15 and 17 via a diaphragm driving circuit 22 and a mechanism driving circuit 23 based on the brightness information and the focus information input from the signal processing circuit 19, an input from photographing-mode selection means 21, and the like.

In an ordinary image pickup apparatus, there are limits in the highest shutter speed, the minimum stop value of the diaphragm, and high brightness of an object which can be photographed depending on the sensitivity of an image pickup system. Particularly, in the high-resolution photographing mode in the above-described image pickup apparatus, since the stop plate 12 having the circular stop 12a of a specific diameter is inserted in the optical path, it is impossible to photograph a high-brightness object compared with a photographing operation in the standard photographing mode. As a result, a valuable photographing chance may be lost. In such a case, although it is possible to reduce the mount of incident light using light-reducing means, such as an ND filter or the like, it is necessary to carry the ND filter, or to provide a mechanism for inserting/retracting the ND filter relative to the optical path. However, it is very inconvenient to carry an ND filter and mount it in the image pickup apparatus at every photographing operation, and it is uneconomical to separately provide a mechanism for inserting/retracting the ND filter relative to the optical path.

SUMMARY OF THE INVENTION

It is an object of the present invention to provide a diaphragm device or an image pickup apparatus which can solve the above-described problems.

It is another object of the present invention to provide an image pickup apparatus which can use a diaphragm device suitable for the selected photographing mode without using a complicated mechanism.

It is still another object of the present invention to provide an image pickup apparatus having a standard-picture-quality photographing mode and a high-picture-quality photographing mode, and which can perform optimum diaphragm control in each of the photographing modes.

It is yet another object of the present invention to provide a structure to enable a light-reducing member, such as an ND filter or the like, to be inserted/retracted in the optical path without using a newly provided mechanism in a high-resolution photographing operation.

According to one aspect of the present invention, an image pickup apparatus includes a first diaphragm having a variable numerical aperture, a second diaphragm having a fixed numerical aperture, a light-reducing member mounted on a moving portion of the first diaphragm, and control means for causing insertion/retraction of the light-reducing member into the optical path of the second diaphragm by operating the first diaphragm in a state in which the second diaphragm is used.

According to another aspect of the present invention, a diaphragm device includes a first diaphragm comprising a plurality of diaphragm blades, a second diaphragm having a fixed aperture shape, and a light-reducing member mounted on one of the plurality of diaphragm blades of the first diaphragm. The light-reducing member is larger than the aperture of the second diaphragm.

According to still another aspect of the present invention, a diaphragm device includes a diaphragm unit for forming a diaphragm by opening/closing a plurality of diaphragm blades and having a light-reducing member mounted on at least one of the plurality of diaphragm blades, and a stop plate having a predetermined stop shape and which is inserted in and retracted from the optical path whenever necessary. The light-reducing member has such a size and is disposed at such a position that the entire light beam passing through the aperture of the stop plate is covered when the diaphragm unit has a predetermined aperture.

According to yet another aspect of the present invention, an image pickup apparatus includes a diaphragm unit for forming a diaphragm by opening/closing a plurality of diaphragm blades and having a light-reducing member mounted on at least one of the plurality of diaphragm blades, and a stop plate having a predetermined circular stop which is inserted in and retracted from the optical path in accordance with a photographing mode. The light-reducing member has such a size and is disposed at such a position that a light beam passing through the circular stop plate is covered when the diaphragm unit has a predetermined aperture. The apparatus also includes control means for switching between a standard photographing mode and a high-resolution photographing mode. In the high-resolution photographing mode, the apparatus is controlled so as to fully open the diaphragm unit and insert the stop plate in the optical path, and to cause the diaphragm unit to have the predetermined aperture when the brightness of an object is equal to or greater than a predetermined value.

The foregoing and other objects, advantages and features of the present invention will become more apparent from the following detailed description of the preferred embodiment taken in conjunction with the accompanying drawings.

BRIEF DESCRITION OF THE DRAWINGS

FIGS. 4(a) through 4(c) are diagrams illustrating the relationship between diaphragm blades and an ND filter of a diaphragm device according to an embodiment of the present invention.

FIGS. 6(a) and 6(b) are autoexposure program diagrams according to the embodiment.

DETAILED DESCRIPTION OF THE PREFERRED EMBODIMENT

A description will now be provided of a diaphragm device and an image pickup apparatus according to an embodiment of the present invention with reference to the drawings.

Figure 4A:
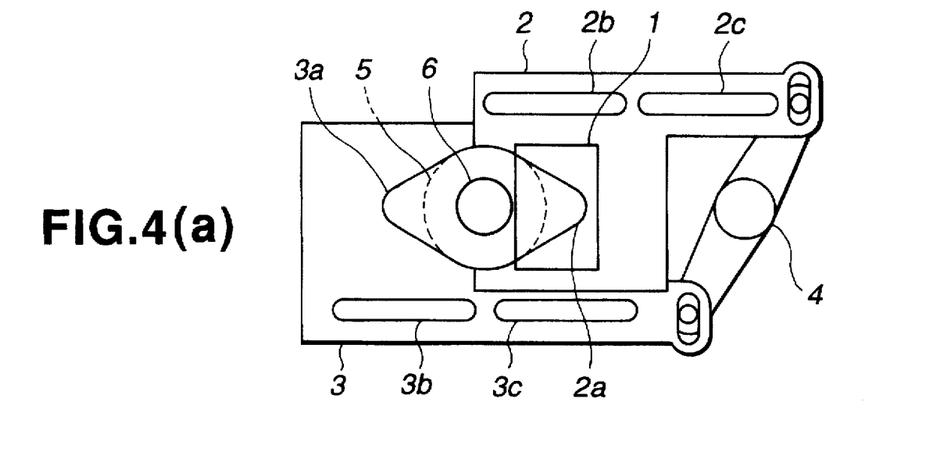
FIG. 4(a) is a diagram illustrating a state in which the diaphragm blades are fully opened.
Figure 4B:
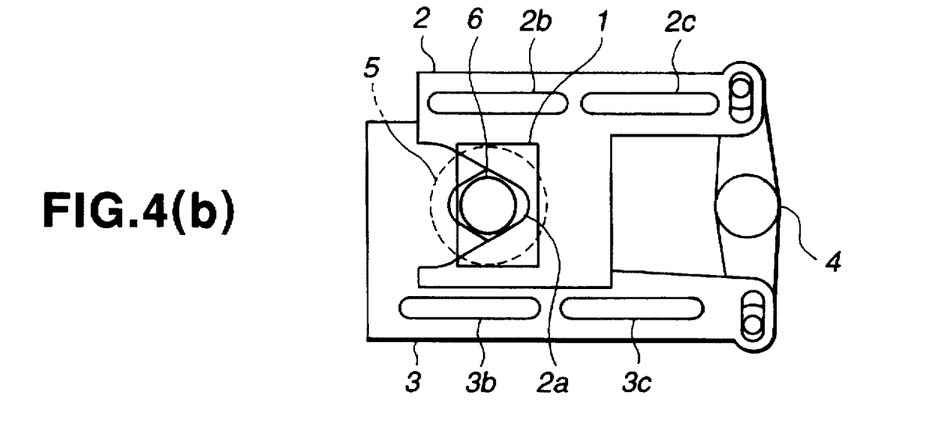
FIG. 4(b) is a diagram illustrating a state in which the diaphragm blades provide a predetermined aperture.
Figure 4C:
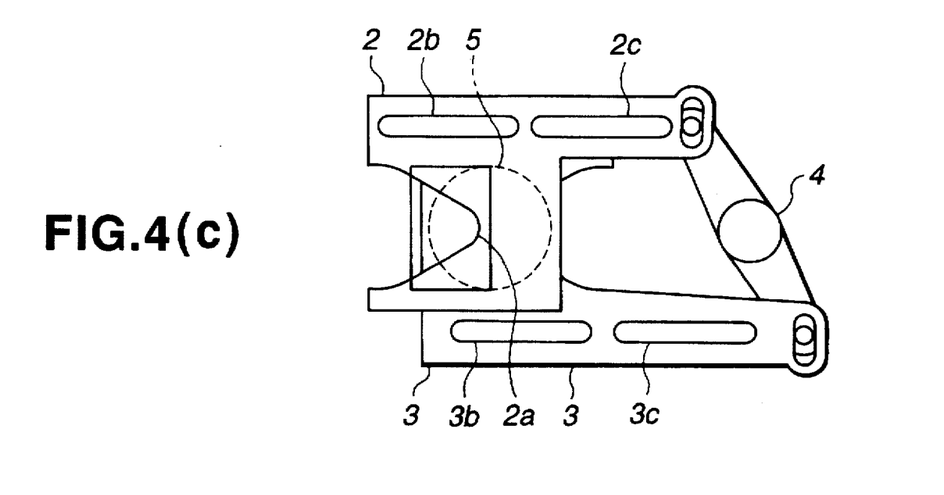
FIG. 4(c) is a diagram illustrating a state in which the diaphragm blades are completely closed.

FIGS. 4(a) through 4(c) illustrate the configuration of the diaphragm device of the embodiment. The configuration of the circuitry of the entire image pickup apparatus in which the diaphragm device is provided is substantially the same as the configuration shown in FIG. 3, except that the control functions of the CPU are different. The configuration of a diaphragm unit for forming a diaphragm by opening/closing a plurality of diaphragm blades is substantially the same as in the conventional configuration shown in FIG. 1.

In FIGS. 4(a) through 4(c), there are shown an ND filter 1, serving as a light-reducing member, a diaphragm blade 2 having the ND filter 1 mounted thereon, and another diaphragm blade 3. These diaphragm blades 2 and 3 move in horizontal directions in FIGS. 4(a) through 4(c) by being guided by slits 2b and 2c, and 3b and 3c, respectively. A driving lever 4 drives the diaphragm blades 2 and 3, and is rotated by an actuator (shown in FIG. 1). In accordance with the rotation of the driving lever 4, the diaphragm blades 2 and 3 move in opposite directions, and a diaphragm is formed by respective apertures 2a and 3a. Reference numeral 5 represents the diameter of a fixed stop 37 (see FIG. 1) opened in the base 31 of the diaphragm unit. Reference numeral 6 represents the diameter of a light beam produced by the circular stop 12a (see FIG. 3) provided in the stop plate 12.

FIGS. 4(a) through 4(c) illustrate operations of the diaphragm unit and the stop plate 12 in a high-resolution photographing mode. As shown in FIG. 4(a), in a state in which the diaphragm blades 2 and 3 are fully opened, the ND filter 1 does not cover the diameter 6 of the light beam at all. However, as shown in FIG. 4(b), when the aperture 2a of the diaphragm blade 2 has a predetermined aperture diameter not covering the diameter 6 of the stop plate 12, i.e., an aperture diameter more or less greater than the diameter of the circular stop 12a formed in the stop plate 12, the ND filter 1 has such a size and is bonded at such a position that the entire diameter 6 is covered. When the brightness of incident light from the object in the high-resolution photographing mode is high, a photographing operation is performed while stopping the diaphragm to the state shown in FIG. 4(b). FIG. 4(c) illustrates a state in which the diaphragm is closed.

Figure 5:
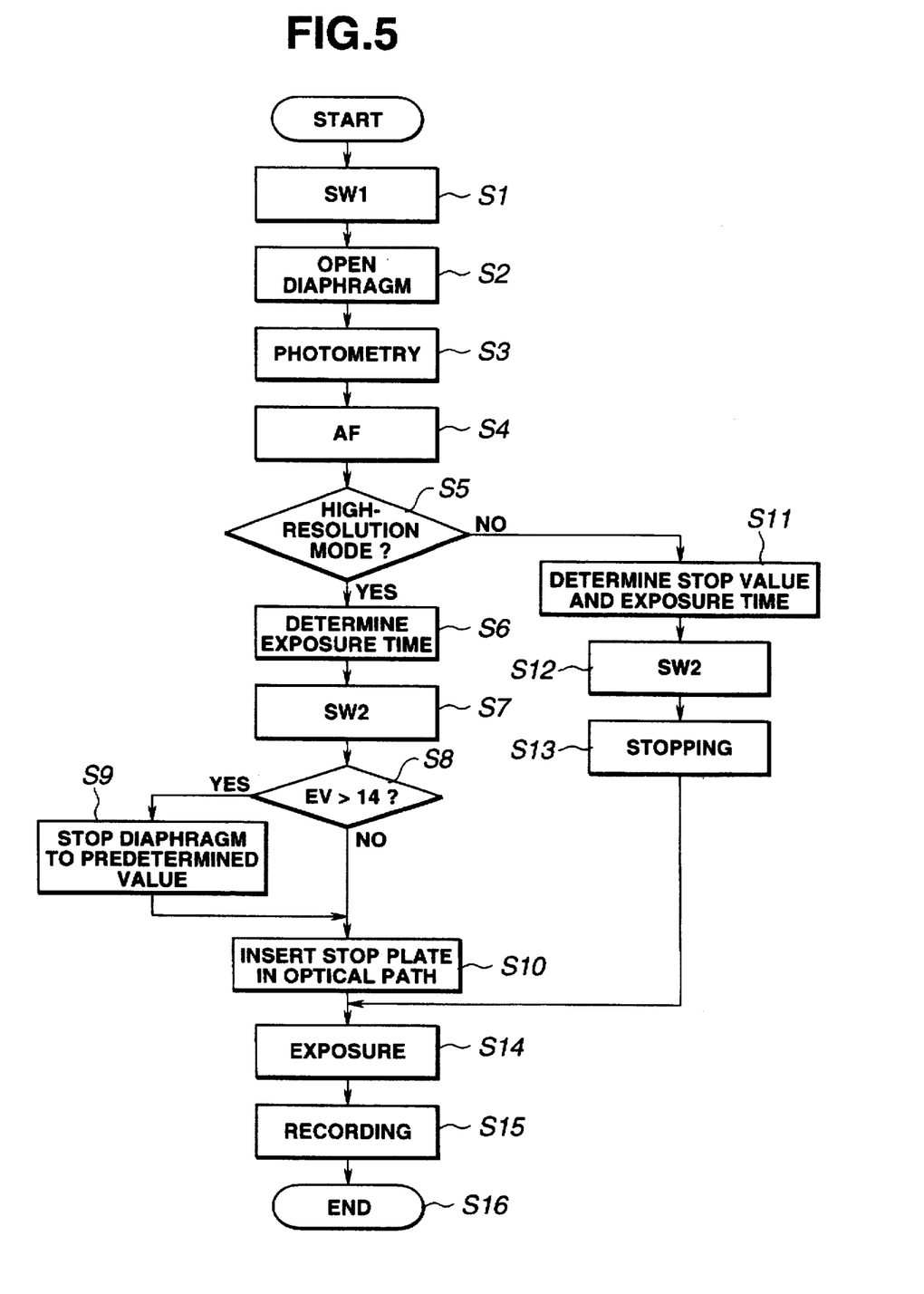
FIG. 5 is a flowchart illustrating operations according to the embodiment.

Next, a description will be provided of a photographing sequence of an electronic camera, serving as the image pickup apparatus, using the diaphragm device of the present embodiment, with reference to the flowchart shown in FIG. 5. The photographing sequence is controlled by the CPU 20. The configuration of the circuitry of the electronic camera is substantially the same as the configuration shown in FIG. 3.

First, in step S1, a release button (not shown) of the electronic camera is depressed to a first distance to switch on a switch SW1. In step S2, the diaphragm is opened. In this state, photometry (step S3) and autofocusing control is performed (step S4) using the electronic-shutter function of the CCD.

Figure 6A:
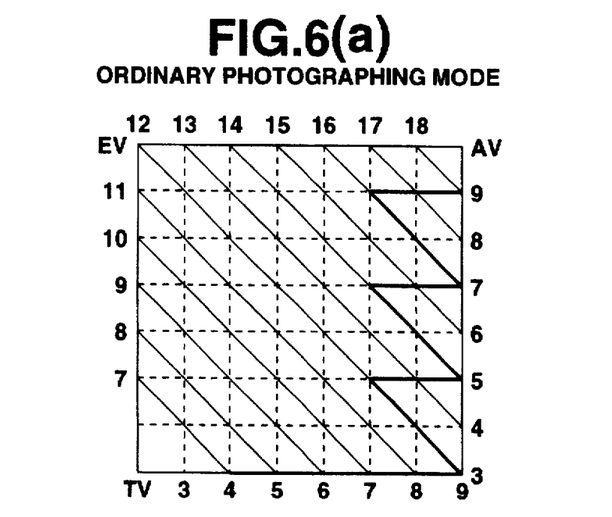
FIG. 6(a) is a program diagram in an ordinary photographing mode.
Figure 6B:
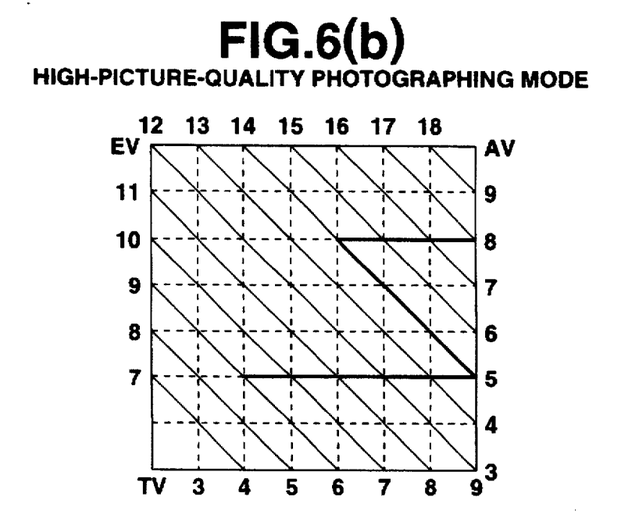
FIG. 6(b) is a program diagram in a high-resolution photographing mode.

Upon completion of focus adjustment, the process proceeds to step S5, where mode determination is performed. When the high-resolution mode is set by the photographing-mode input means 21, the process proceeds to step S6, and a high-resolution photographing operation is performed. In step S6, the exposure time is determined from the brightness of the object measured in step S3 using a program diagram for the high-resolution photographing mode shown in FIG. 6(b). In FIGS. 6(a) and 6(b), oblique lines represent amounts of exposure EV (7–18), the ordinate represents stop values AV (3–9), and the abscissa represents exposure times TV (3–9).

After determining the exposure time, the process proceeds to step S7, where it waits until the release button is depressed to a second, further distance. When the release button has been depressed to the second distance in step S7 to switch on a switch SW2, the process proceeds to step S8. If the brightness of the object measured in step S3 is greater than EV14 in step S8, the process proceeds to step S9, where the diaphragm is stopped to the aperture shown in FIG. 4(b) (AV5 in FIG. 6(b)), and the process proceeds to step S10. If the brightness of the object is less than EV14 in step S8, the process proceeds to step S10 while opening the diaphragm (AV8 in FIG. 6(b)). In step S10, the stop plate 12 is inserted in the optical path by driving the actuator, and the process then proceeds to step S14.

When the standard photographing mode is selected in step S5, the process proceeds to step S11, where the stop value and the exposure time are determined from the brightness of the object measured in step S3 using a program diagram shown in FIG. 6(a). The process then proceeds to step S12, where it waits until the release button is depressed to the second distance. In step S13, the diaphragm is stopped to the stop value determined in step S11. When the diaphragm has been stopped to the determined value, the process proceeds to step S14.

In step S14, actual exposure is performed by combining the electronic-shutter function of the CCD 18 and a closing operation of the diaphragm. At that time, exposure is started by resetting the CCD 18, and is terminated by closing the diaphragm at the timing of exposure for the exposure time determined in step S6 or S11.

The process then proceeds to step S15, where an image of the object recorded in the CCD 18 is read and recorded in a recording medium (not shown), and the photographing operation is terminated.

As described above, according to the present embodiment, optimum diaphragm control can be performed in accordance with a photographing mode. Furthermore, no complicated mechanism is required for optimizing the diaphragm mechanism, and therefore a low-cost and small image pickup apparatus can be provided.

In the image pickup apparatus of the embodiment, when photographing a high-brightness object in a high-resolution photographing mode of the apparatus, light-reducing means, such as an ND filter or the like, can be inserted in and retracting from the optical path without providing a separate mechanism, and therefore it is economical. Furthermore, it is unnecessary to carry an ND filter at every photographing operation as in conventional cases, and therefore it is convenient.

The individual components shown in outline or designated by blocks in the drawings are all well known in the image pickup arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus comprising:
    a first diaphragm having a variable numerical aperture;
    a second diaphragm having a fixed numerical aperture;
    a light-reducing member mounted on a moving portion of said first diaphragm; and
    control means for enabling insertion of said light-reducing member in the optical path of said second diaphragm by operating said first diaphragm in the state that incident light is being stopped down by said second diaphragm so that the light reducing member covers the entire aperture of the second diaphragm.

2. An apparatus according to claim 1, wherein said first diaphragm comprises a plurality of diaphragm blades.

3. An apparatus according to claim 2, wherein said second diaphragm comprises a circular stop having a fixed aperture diameter.

4. An apparatus according to claim 3, wherein said light-reducing member comprises an ND (neutral-density) filter.

5. An apparatus according to claim 4, wherein said ND filter is mounted on one of the plurality of diaphragm blades of said first diaphragm, and wherein said control means inserts or retracts said ND filter into or from an optical path of said second diaphragm in correspondence with an opening/closing operation of the diaphragm blades.

6. An apparatus according to claim 1, wherein said control means causes said first diaphragm to be used in a standard-resolution photographing mode and said second diaphragm to be used in a high-resolution photographing mode.

7. A diaphragm device comprising:
    a first diaphragm comprising a plurality of diaphragm blades;
    a second diaphragm having a fixed shape of an aperture and used in a high-resolution mode; and
    a light-reducing member mounted on one of the plurality of diaphragm blades of said first diaphragm, said light-reducing member being larger than the aperture of said second diaphragm to entirely cover the aperture of said second diaphragm.

8. An apparatus according to claim 7, wherein said light-reducing member comprises an ND filter.

9. An apparatus according to claim 7, wherein the aperture of said second diaphragm has a circular shape.

10. An apparatus according to claim 7, wherein said control means causes said light-reducing member to be inserted in or retracted from the aperture of said second diaphragm by moving the diaphragm blades of said first diaphragm.

11. An apparatus according to claim 7, wherein said control means causes said first diaphragm to be used in a moving-picture photographing operation and said second diaphragm to be used in a still-picture photographing operation.

12. A diaphragm device comprising:
- a diaphragm unit for forming a diaphragm by opening/closing a plurality of diaphragm blades and having a light-reducing member mounted on at least one of the plurality of diaphragm blades; and
- a stop plate having a predetermined shape stop and being movable into and out of an optical path of said diaphragm unit;
- wherein said light-reducing member has such a size and is disposed at such a position that a light beam passing through the stop of said plate is entirely covered by said light-reducing member in the case that said diaphragm unit has a predetermined aperture.

13. A device according to claim 12, wherein said stop plate has a circular-shaped stop, and wherein said light-reducing member has such a size and is disposed at such a position that a light beam passing through the circular-shaped stop of said, stop plate is not covered when said diaphragm unit is opened greater than the predetermined aperture.

14. An apparatus according to claim 12, wherein the stop of said stop plate has a circular shape.

15. An image pickup apparatus comprising:
- a diaphragm unit for forming a diaphragm by opening/closing a plurality of diaphragm blades and having a light-reducing member mounted on at least one of the plurality of diaphragm blades;
- a stop plate having a predetermined circular-shaped stop and being movable into and out of an optical path of said diaphragm unit in accordance with a photographing mode, said light-reducing member having such a size and being disposed at such a position that a light beam passing through the circular-shaped stop is entirely covered when said diaphragm unit has a predetermined aperture; and
- control means for switching between a standard photographing mode and a high-resolution photographing mode, in the high-resolution photographing mode, said control means causing said diaphragm unit to be opened and said stop plate to be inserted into an optical path of said circular-shaped stop, said control means causing said diaphragm unit to have said predetermined aperture when a brightness of an object picked up by said image pickup apparatus is equal to or greater than a predetermined value.

16. An apparatus according to claim 15, wherein said light-reducing member comprises an ND filter.

17. An apparatus according to claim 15, wherein said control means comprises a central processing unit.

* * * * *

UNITED STATES PATENT AND TRADEMARK OFFICE
CERTIFICATE OF CORRECTION

PATENT NO. : 5,764,292
DATED : June 9, 1998
INVENTOR(S) : TOSHINOBU YAMAGUCHI

It is certified that error appears in the above-indentified patent and that said Letters Patent is hereby corrected as shown below:

Column 1

Line 21, "which" should be deleted; and
    Line 28, "factors" should read --the factors--.

Column 2

Line 51, "mount" should read --amount--.

Column 4

Line 9, "invention:" should read --invention;--; and
    Line 18, "embodiment:" should read --embodiment;--.
    Line 48, "3a" should read --3a.--.

Column 6

Line 7, "retracting" should read --retracted--.

Signed and Sealed this

Second Day of March, 1999

Attest:

Q. TODD DICKINSON

*Attesting Officer*     *Acting Commissioner of Patents and Trademarks*